US012736155B2

(12) United States Patent
Salehi-Bakhtiari

(10) Patent No.: US 12,736,155 B2
(45) Date of Patent: Sep. 15, 2026

(54) FITTING FOR CONNECTING TO A TUBULAR ELEMENT, TUBING CONNECTION AND A METHOD FOR CONNECTING A FITTING TO A TUBULAR ELEMENT

(71) Applicant: Conex IPR Limited, Kingswinford (GB)

(72) Inventor: Manouchehr Salehi-Bakhtiari, Kingswinford (GB)

(73) Assignee: Conex IPR Limited, Kingswinford (GB)

(*) Notice: Subject to any disclaimer, the term of this patent is extended or adjusted under 35 U.S.C. 154(b) by 0 days.

(21) Appl. No.: 15/522,272

(22) PCT Filed: Oct. 29, 2015

(86) PCT No.: PCT/IB2015/058341
§ 371 (c)(1),
(2) Date: Apr. 26, 2017

(87) PCT Pub. No.: WO2016/067231
PCT Pub. Date: May 6, 2016

(65) Prior Publication Data

US 2017/0328498 A1 Nov. 16, 2017

(30) Foreign Application Priority Data

Oct. 31, 2014 (EP) .................................... 14191353

(51) Int. Cl.

| | |
|---|---|
| ***F16L 13/14*** | (2006.01) |
| ***F16L 25/01*** | (2006.01) |
| ***F16L 33/207*** | (2006.01) |

(52) U.S. Cl.
CPC ........... *F16L 13/147* (2013.01); *F16L 13/142* (2013.01); *F16L 13/146* (2013.01); *F16L 25/01* (2013.01);
(Continued)

(58) Field of Classification Search
CPC ..... F16L 13/147; F16L 13/146; F16L 13/142; F16L 25/01; F16L 33/2073; F16L 13/14; F16L 19/028; F16L 13/116
(Continued)

(56) References Cited

U.S. PATENT DOCUMENTS 1,186,813 A 6/1916 McFerran
3,149,861 A * 9/1964 Larsson ................ F16L 13/142 285/382.2
(Continued)

FOREIGN PATENT DOCUMENTS

CH 695026 A5 * 11/2005 ............ F16L 13/146
CL 1997-01500 6/1998
(Continued)

OTHER PUBLICATIONS

JP-08145265-A—Machine Translation—English (Year: 1996).*
(Continued)

*Primary Examiner* — William S. Choi
(74) *Attorney, Agent, or Firm* — Jones Day

(57) ABSTRACT

A fitting (3, 3') for connecting to a tubular element (5, 5') having a first end section (9, 9') comprising at least one first connection element (21, 21'), wherein the diameter of at least a part of the first connection element (21, 21') can be reduced in a radial direction in order to produce a connection, wherein the first connection element (21, 21') comprises at least one first hook element (21, 21') and/or at least one first crimp (237, 437) configured to be connected in force-fit and/or form-fit manner to at least one second crimp
(Continued)

(7, 7') and/or at least one second hook element (235) formed on the outer surface of the tubular element, when the diameter of at least a part of the first connection element (21, 21') is reduced, as well as a tubing connection and a method for connecting a fitting to a tubular element.

20 Claims, 10 Drawing Sheets

(52) U.S. Cl.
CPC ....... *F16L 33/2073* (2013.01); *F16L 2201/10* (2013.01)

(58) Field of Classification Search
USPC .................. 285/382.5, 382.1, 399, 374, 231
See application file for complete search history.

(56) References Cited

U.S. PATENT DOCUMENTS 3,375,026 A 3/1968 Szohatzky
3,476,413 A 11/1969 Coberly et al.
3,606,402 A 9/1971 Medney
3,759,553 A 9/1973 Carter
3,767,211 A * 10/1973 Amphlett
3,823,216 A 7/1974 Petzetakis
5,168,618 A * 12/1992 Unewisse ............ F16L 13/142 29/508
5,492,376 A 2/1996 Usui et al.
5,527,503 A 6/1996 Rowley
5,758,907 A 6/1998 Dole et al.
6,450,553 B1 9/2002 Suresh
6,481,764 B1 * 11/2002 Kwok .................. F16L 13/142 285/382.2
6,581,983 B1 * 6/2003 Viegener .............. F16L 13/142 285/382
6,692,040 B1 2/2004 McKay et al.
7,654,588 B2 2/2010 Schwalm
7,806,443 B1 10/2010 Plattner
8,118,331 B2 2/2012 Yamashita et al.
8,398,121 B2 3/2013 Lotti
9,249,907 B2 * 2/2016 Mester .................. F16L 13/142
2003/0222409 A1 12/2003 Sivley et al.
2007/0228732 A1 10/2007 Schwalm
2008/0303277 A1 12/2008 Yamashita et al.
2010/0025982 A1 * 2/2010 Jamison ................ F16L 13/116
2010/0253066 A1 10/2010 Cygler et al.
2011/0016696 A1 1/2011 Hofmann et al.
2011/0204624 A1 8/2011 Lawrence
2011/0215573 A1 9/2011 Tanaka et al.
2011/0289761 A1 12/2011 Michels et al.
2012/0139236 A1 * 6/2012 Novitsky ............. F16L 21/022 285/399
2013/0049361 A1 * 2/2013 Salehi-Bakhtiari
2014/0062078 A1 3/2014 Weissmann
2014/0197633 A1 * 7/2014 Nixon .................. F16L 13/142 285/382

FOREIGN PATENT DOCUMENTS

CL 1997-02711 9/1998
CN 1253253 5/2000
CN 2497135 6/2002
CN 1440498 9/2003
CN 2797823 7/2006
CN 101981363 A 2/2011
DE 2725280 A1 12/1978
DE 9417646 12/1994
DE 10026083 10/2001
DE 10026083 C1 10/2001
DE 102005012908 9/2006
DE 102008010083 A1 8/2009
DE 102008039446 A1 1/2010
EP 0710793 5/1996
EP 1171731 1/2002
EP 1171731 B1 8/2003
EP 2236889 10/2010
EP 2236889 B1 8/2012
EP 3015751 B1 10/2017
GB 2294516 A * 5/1996
GB 2320304 B 5/2001
JP 08145265 A * 6/1996
JP A H08-145265 6/1996
JP A H10-078176 3/1998
JP A H11-324569 11/1999
JP 2009168075 7/2009
JP 2011169335 A 9/2011
KR 2003076817 A * 9/2003
KR 2014017902 A * 2/2014
WO WO-9324780 A1 * 12/1993
WO WO 2005/066533 A1 7/2005
WO WO 2005/103549 A1 11/2005
WO WO 2008/023035 A1 2/2008
WO WO 2010/114983 A1 10/2010

OTHER PUBLICATIONS

KR-2003076817-A—Machine Translation—English (Year: 2003).*
KR-2014017902-A—Machine Translation—English (Year: 2014).*
KR-2014017902-A—Abstract—Machine Translation—English (Year: 2014).*
International Search Report for PCT/IB2015/058341 dated Jan. 21, 2016 (4 pages).
Written opinion of the international searching authority for PCT/IB2015/058341dated Jan. 18, 2016 (4 pages).
IPRP for PCT/IB2015/058341 dated Feb. 13, 2017 (6 pages).
Exended European Search Report for 14191353.3 dated Apr. 20, 2015 (6 pages).

* cited by examiner

FITTING FOR CONNECTING TO A TUBULAR ELEMENT, TUBING CONNECTION AND A METHOD FOR CONNECTING A FITTING TO A TUBULAR ELEMENT

CROSS-REFERENCE TO RELATED APPLICATIONS

This application is a national stage filing under 35 U.S.C. § 371 of International Patent Application No. PCT/IB2015/058341, filed on Oct. 29, 2015, which claims the benefit of European Patent Application No. 14191353.3, filed on Oct. 31, 2014, the entire contents of each of which are incorporated by reference herein.

FIELD

The invention relates to a fitting for connecting to a tubular element having a first end section comprising at least one first connection element, wherein the diameter of the first connection element can be reduced in a radial direction in order to produce a connection as well as a tubing connection comprising an inventive fitting and a method for connecting an inventive fitting to a tubular element.

BACKGROUND

In the state of the art a plurality of fittings is known.

For example EP 1 171 731 B1 discloses a fitting or mounting for producing a press joint with an inserted tube end. It is proposed that the fitting has an end section which can be crimped in order to produce a connection with a tubular component. It is proposed that in an annular bead at least one bulge or indentation is provided to establish a clearance between a sealing ring located in the annular bead and the wall of the end section. The clearance provides a deliberate leakage between the tubular component and the fitting before the crimping of the end section is carried out.

Such a fitting generally only works fine with comparable low pressures. Especially for low pressures the crimping provides sufficient force to establish a force fit between the tubular component and the fitting. However, in case the pressure within the tubular element is increased and/or a force is acting on the tubular element the connection between the fitting and the tubular component might become loose.

In the state of the art further fittings have been proposed to increase a connection between the fitting and the tube. For example DE 100 26 083 C1 discloses a tubular press fitting. The press fitting comprises on the inner side at least one tooth element. When pressing the press fitting the tooth element cuts into the outer surface of the tubular element.

Also EP 2 236 889 B1 shows a fitting for connecting a tube that uses a comparable connection mechanism. It is proposed that the fitting comprises a pressing section. The pressing section comprises at least two cutting blades which are fixly connected on the inner side of a hollow body of the fitting. When the pressing section is compressed the cutting blades cut into the outer surface of the tube.

U.S. Pat. No. 6,450,553B1 is directed to an axial swage fitting for large bore pipes and tubes. The fitting for joining pipes, tubes includes a substantially cylindrical sleeve and ring. The sleeve has an inner surface defining a bore, configured to slidably receive the pipe at an open end. The inner sleeve surface also includes protrusions, which deform the outer surface of the pipe upon swaging.

Another fitting is known from US2011/0204624A1 which discloses an universal connection socket comprising a plurality of spaced radially inwardly projecting barbs spanning opposite sides of a circumferential 0-ring receiving groove and dimensioned to grip, when crimped, a fluid conduit in sealable engagement within the socket.

Also DE 94 17 646 U1 is directed to a pipe connection with relief notches. It is proposed that the inner diameter of a connection socket is adapted to the outer diameter of the pipe as well as that a sealing element has a relief notch.

Finally US2008/0303277A1 discloses a non-bolt joint structure comprising a packing ring sealing between a receiving opening section and an insertion opening section; an engaging means provided with an inner circumference of the receiving opening section preventing a polyethylene pipe from disengaging from the receiving opening section by engaging with an outer circumferential surface of the polyethylene pipe; and a tubular metallic inner core fitting an inner circumference of the insertion opening section of the polyethylene pipe. The inner core is plastically deformed to include a first bulge portion that its cross-sectional shape bulges toward an outward radial direction.

SUMMARY

The shown fittings have however the drawback that the connection force is not sufficient to ensure a secure fastening of the tube within the fitting also when the tube is used in ACR applications (air conditioning and refrigeration applications). In such systems fluids with high pressures are used. At the moment the standard pressure for ACR applications is 40 bar but it is planned to increase the standard pressure to 100 to 150 bar for efficiency reasons. At such pressures the fittings known in the state of the art could not secure a sufficient secure and stiff connection between the fitting and the tube. It has been observed that already below a pressure of 100 bar in fittings known in the state of the art the tube starts to move out of the fitting.

It is thus the object of the invention to further develop the fittings known in the state of the art to allow a use of the fitting in systems using pressures of a fluid above 40 bar, especially to provide a fitting that securely fastens the tube to a fitting at such high pressures.

This object is achieved in that the first connection element comprises at least one first hook element and/or at least one first crimp configured to be connected in force-fit and/or form-fit manner to at least one second crimp and/or at least one second hook element formed on the outer surface of the tubular element, when the diameter of the at least a part of first connection element is reduced.

The fitting might be further characterized in that the first hook element and/or the second crimp is/are radially inwardly extending and/or the first crimp and/or the second hook element is/are radially outwardly extending.

Advantageous embodiments of the fitting might be characterized in that the first crimp and the second crimp are connected to each other by a securing element, preferably comprising at least one latch washer, at least one spring washer and/or at least one wave washer.

It is furthermore proposed that the fitting is characterized by at least one first sealing element, preferably arranged at least partly in at least one radially outwardly extending annular recess, wherein preferably the annular recess is at least partly comprised by the first connection element and/or the first sealing element comprises at least one sealing ring, at least one O-ring, at least one elastomeric material, at least one viscous fluid type sealant, at least one adhesive sealant, at least one receptacle comprising at least one sealant, wherein the receptacle is preferably ruptured when the diameter of the section is reduced, whereby releasing the sealant contained in the receptacle, at least one metallic seal and/or, at least one labyrinth-sealing.

The invention further more proposes that the sealing element has an internal diameter being smaller, mainly identical or greater than the outer diameter of the tubular element and/or the inner diameter of the fitting.

Also a fitting according to the invention can comprise at least one second connection element provided at a second end section of the fitting, preferably located opposite the first end section, wherein the second connection element preferably comprises at least one threaded section, especially formed on the inner surface or the outer surface of the second end section, at least one third, especially radially inwardly extending, annular hook element and/or third crimp configured to be connected in force-fit and form-fit manner to at least one, especially radially inwardly extending, fourth crimp and/or, especially radially outwardly extending, fourth hook element formed on the outer surface of another tubular element when a diameter of at least a part of the second connection element is radially reduced, at least one click connection at least one compression connection, at least one press connection, at least one flame joint connection, at least one flame free connection, at least one union connection, at least one flanged connection and/or at least one push connection.

For the before mentioned embodiment it is especially preferred that the fitting comprises a plurality of second connection elements, especially forming a plurality of sockets, extending in different angular directions of the fitting with respect to the first connection element, another second connection element and/or a main axis of the fitting.

Inventive fittings might also be characterized in that the fitting comprises at least one alignment element for aligning the tubular element, especially the second crimp, at least one liner body at least partly introduced into the tubular element and/or the second hook with respect to the fitting, especially with respect to the first connection element, the second connection element, the first hook element the first crimp, the third crimp, the fourth crimp, the third hook element and/or the fourth hook element, wherein the alignment element preferably comprises at least one inwardly extending projection and/or step.

Finally an inventive fitting might be characterized by at least one gripping and/or cutting element, preferably comprising at least one sharp edge, at least one anchor element, at least one barb and/or at least one tooth, especially extending inwardly, wherein the gripping element engages the tubular element, especially cuts into the tubular element.

The invention furthermore provides a tubing connection comprising at least one inventive fitting and at least one tubular element connected to the fitting, wherein the tubular element comprises at least one second crimp and/or at least one second hook element formed on the outer surface of the tubular element and the at least one first hook element and/or the first crimp of the fitting engages the second crimp and/or the second hook element in a form-fit and/or force-fit manner.

The tubing connection might be characterized by at least one liner body at least partly introduced into the tubular element, wherein the liner body preferably comprises at least one fifth crimp and/or cut out, the fifth crimp and/or cut out being preferably alligned along the longitudinal axis of the fitting and/or the tubular element with respect to the first hook element and/or the first crimp.

In the before described embodiment it is preferred that the liner body comprises at least one second sealing element, especially arranged at least partly in at least one radially inwardly extending first annular clearance, for sealing a space between the liner body and the tubular element, and/or at least one third sealing element, especially arranged at least partly in at least one radially inwardly extending third annular clearance, for sealing a space between the liner body and the fitting, wherein the second sealing element and/or the third sealing element comprise(s) at least one sealing ring, at least one O-ring, at least one elastomeric material, at least one viscous fluid type sealant, at least one adhesive sealant, at least one receptacle comprising at least one sealant, wherein the receptacle is preferably ruptured when the diameter of the section is reduced, whereby releasing the sealant contained in the receptacle, at least one metallic seal and/or, at least one labyrinth-sealing.

For the before described two embodiments it is proposed that the liner body comprises at least one gripping structure facing the tubular element, especially comprising at least one tooth, at least one barb, and/or at least one cutting edge.

For the tubing connection it is furthermore proposed that a wall thickness of the tubular element in the area of the second crimp and/or the second hook element is mainly constant, especially identical to the wall thickness of the remaining part of the tubular element and/or the second crimp comprises at least one first indentation on the outer surface of the tubular element and at least one elevation on the inner surface of the tubular element, and/or the second hook element comprises at least one elevation on the outer surface and at least one indentation on the inner surface of the tubular element wherein the respective indentation and the respective elevation have complementary cross sectional forms and/or dimensions.

An inventive tubing might also be characterized in that the tubular element and/or the fitting comprises at least one metallic material, especially copper, iron, steel, stainless steel, brass, cast material and/or forged material, at least one carbon material and/or at least one plastic material, especially polymethylmethacrylate, polycarbonate, polyvinyl chloride, glass fiber and/or reinforced plastic, and/or combinations of at least two of the before mentioned materials.

Furthermore the invention provides a method for connecting at least one fitting to at least on tubular element comprising the steps of providing an inventive fitting, inserting the tubular element into the fitting , at least partly reducing a diameter of at least one section of at least a part of the fitting in a radial direction, wherein by the reduction of the diameter at least one first hook element and/or at least one first crimp of a first connection element of the fitting and/or at least one securing element is/are deformed to engage at least one second crimp and/or at least one second hook element formed on the surface of the tubular element such that a force-fit and/or form-fit connection of the fitting to the tubular element is provided.

For the method it is furthermore proposed that the first hook element and/or the first crimp of the first connection element and/or crimp and/or the second hook element of the tubular element is/are formed by the reduction of the diameter.

For the method it is also proposed that the first crimp, the first hook element, the second crimp and/or the second hook element is/are formed on the outer surface of the tubular element and/or the inner surface of the fitting, especially the first connection element, prior to the pressing of the fitting, is especially preformed in the tubular element and/or the fitting.

Advantageous embodiments of the inventive method might be characterized in that before, during and/or after inserting the tubular element into the fitting at least one liner body is inserted into the tubular element.

Finally the inventive method might be characterized in that the at least partly reduction of the diameter is reached by pressing the at least one section with at least on press tool, preferably a crimping tool, and/or by sliding at least a cap and/or ring onto the section, wherein especially the inner diameter of the cap and/or ring is in at least one sector decreasing in an axial direction of the ring and/or cap, preferably in a sector coacting with the section of the fitting and/or the ring and/or cap are threaded onto the section and/or connected to the section by at least one bayonet connection.

The invention is thus based on the astonishing perception that by using annular hook elements it becomes possible to connect the fitting to a tubular element so that the connection can resist pressure fluids of above 40 bar. The hook element might be formed as an element that runs circumferentially around the tubular element and/or the fitting or might be formed by and/or included in a plurality of tongues providing a plurality of separated segments partly circumferentially running around the tubular element and/or the fitting, respectively. This makes the fitting especially applicable in ACR applications. By the hook element it becomes possible that the hook element engages a crimp that is formed on the outer surface of the tubular element or the inner surface of the fitting in a form-fit and force-fit manner.

A crimp in the sense of the invention is an indentation on the outer surface of the tubular element and/or the inner surface of the fitting wherein the thickness of the wall of the tubular element and/or fitting is/are however constant over the area of the indentation.

In comparison to cutting elements known in the state of the art that produce a cut into the outer wall of the tubular element a crimp in the sense of the invention does not weaken the structure of the tubular element/fitting. Especially in fittings known in the state of the art that use cutting elements it can be observed that the cutting elements lead to a weakening of the structure. When high pressures are used especially the tubular element tends to break in the area of the cut.

In comparison to such a cutting element a hook in the sense of the invention if at all only deforms a corresponding surface of the tubular element fitting but does not cut into the surface. Depending on the material used for the fitting and the tubular element the respective crimp and/or the respective hook element might be pre-formed in the tubular element, for example in case the tubular element comprises plastic materials.

In case the tubular element and/or the fitting comprise(s) for example a metal material it is possible that by reducing the diameter of the pressing section of the press fitting, for example by a press tool, the respective crimp(s) and/or the respective corresponding hook element(s) is/are formed within the tubular element by a hook element and/or the press tool. Due to the fact that the hook is annular, that means is running around the whole periphery of the fitting, it is secured that the form fit leads to the effect that the tube cannot be disconnected from the fitting also when pressures of more than 200 bar are used.

The inventive fitting has especially been tested for pressures of about 200 bar and no movement of the tubular element with the spectrum fitting could be observed but the test equipment failed.

To provide a sealing of the connection of the fitting with the tubular element is proposed that a sealing element is provided. However the sealing might be reached by the fitting and the tubular element itself especially their form without a separate additional sealing element. The sealing element could be an elastomeric seal that is located within an annular recess. For example the seal might comprise an O-ring. Such a seal might also be used as an indication for a missing connection of the tubing element and the fitting.

In case the seal is dimensioned to have a greater inner diameter in comparison to the auto diameter of the tubular element a leakage is occurring in case the fitting is not pressed. Alternatively the sealing element might comprise a viscouse fluid type sealant contained within a suitable receptacle that may be essentially circular and located in place of or adjacent to the O-ring. The pressing action, when reducing the diameter of the press fitting ruptures the receptacle and releases the sealing liquid.

A fitting might furthermore comprise at least one second end section. This second end section might have any form and function, for example allowing a connection of the fitting to an additional tubular element. This second end connection might allow a connection with an additional tubular element in any way known in the state of the art. The connection to the additional tubular element might be preferably reached by a threaded connection or by a connection element comprising a hook that engages a crimp that are provided within the fitting and further tube, respectively.

Also other connection types for connecting the fitting to another tube maybe used, like click connections, connections via an adhesive material or by welding.

Especially the fitting might be formed as a distributor that means that the fitting comprises a plurality of sections that are directed into different directions, especially off set from a longitudinal axis of the first end section.

To secure a correct positioning of the respective hook relative to the respective crimp, that is/are especially preformed the invention furthermore proposes at least one a alignment element. To reach a coincidence of the hook element with the internal projection within the fitting, especially a circumferential projection might be used. The projection engages with the tube end such that a distance between the projection and the hook element is approximately the same as the distance of the end of a tube element and the crimp.

To further secure the connection between the tubular element and the fitting an additional crimping or cutting element might be provided. Probably such a gripping or cutting element does not cut into the outer surface of the tubular element when the diameter of the fitting is reduced. However in case the tubular element tends to move out of the fitting the gripping element engages the outer surface of the tubular element and hinders the tubular element from a further movement out of the fitting. In such a case the displacement of the tubular element with respect to the fitting can be seen from outside as the hook will not anymore fully engage the crimp and thus becomes visible at least partly.

As already mentioned the structure of the inventive fitting elements allows that the fitting and on/or the tubular element to be made of a variety of different materials, like metallic materials and/or plastic materials and combinations. Thus the fitting becomes useable for nearly any function within an ACR-application.

The reduction of the diameter of the fitting may be reached in different ways. The reduction might be reached by a pressing tool. However it is also possible that the reduction or deformation of the fitting element is achieved by means of an external cap that is shaped to urge a diametrical reduction pressed into a place by an axial pressing of the cap into the fitting. To reach this aim the cap might have a frustoconical cross section such that when the cap is pushed onto the fitting the diameter of the fitting is reduced. The pushing movement might be reached by a turning action to connect the cap to the fitting by a thread and/or a bayonet connection. In general the invention covers any radial movement, linear movement or combination of such movements of a tool or member that leads to an introduction of the hook element into a tubular element, especially a crimp, irrespective whether the tubular element has been preformed, especially whether the crimp has been preformed or not.

In an alternative embodiment there is no interlink between a hook element and a cooperating crimp but two crimps are interlocked by a securing element. The crimps might be formed in the outer surface of the tubular element and the inner surface of the fitting, respectively and when connecting the tube element to the fitting the securing element, like a spring ring is located in one of the crimps such that the securing element interlinks the crimps when the tube element and the fitting are alligned.

Further aspects and advantages of the claimed invention become apparent from the following description of preferred embodiments of the invention that are explained with the help of the following figures in which

DESCRIPTION OF THE ACCOMPANYING FIGURES

Figure 8A:
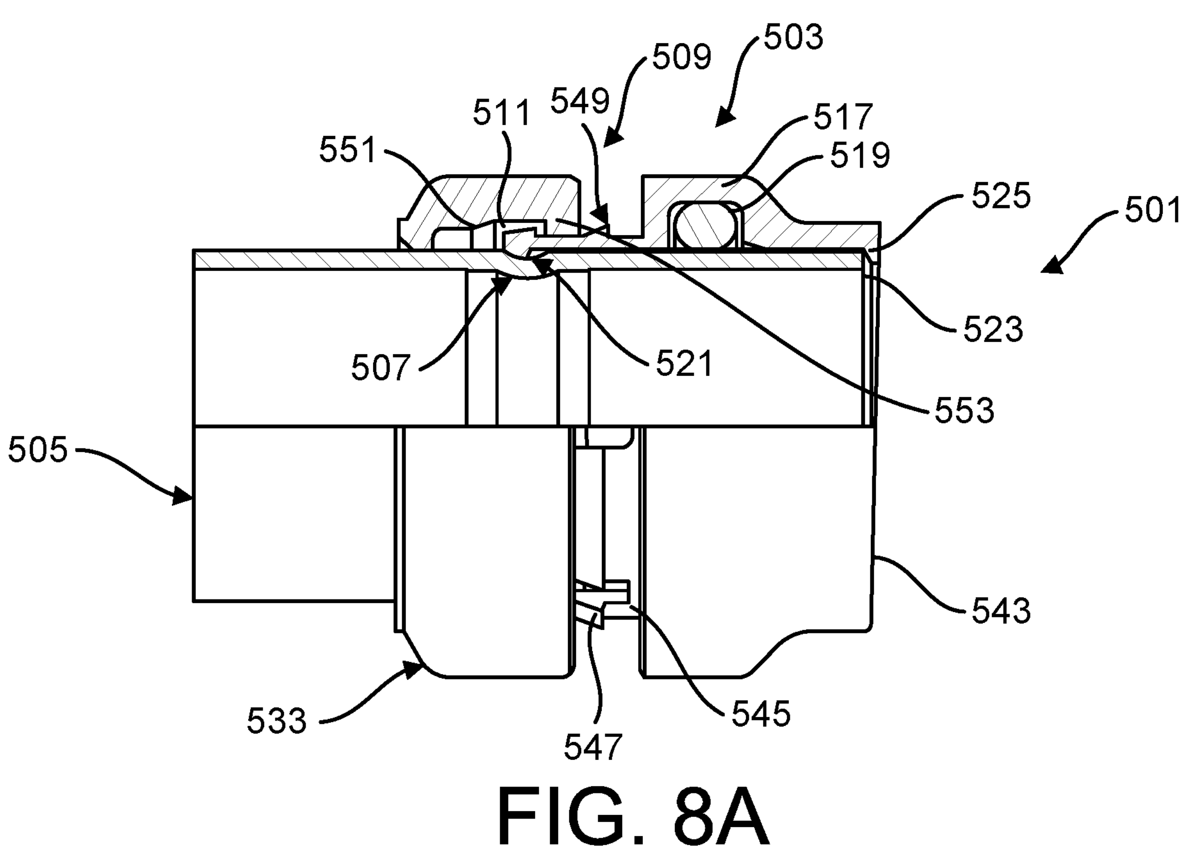
Figure 8B:
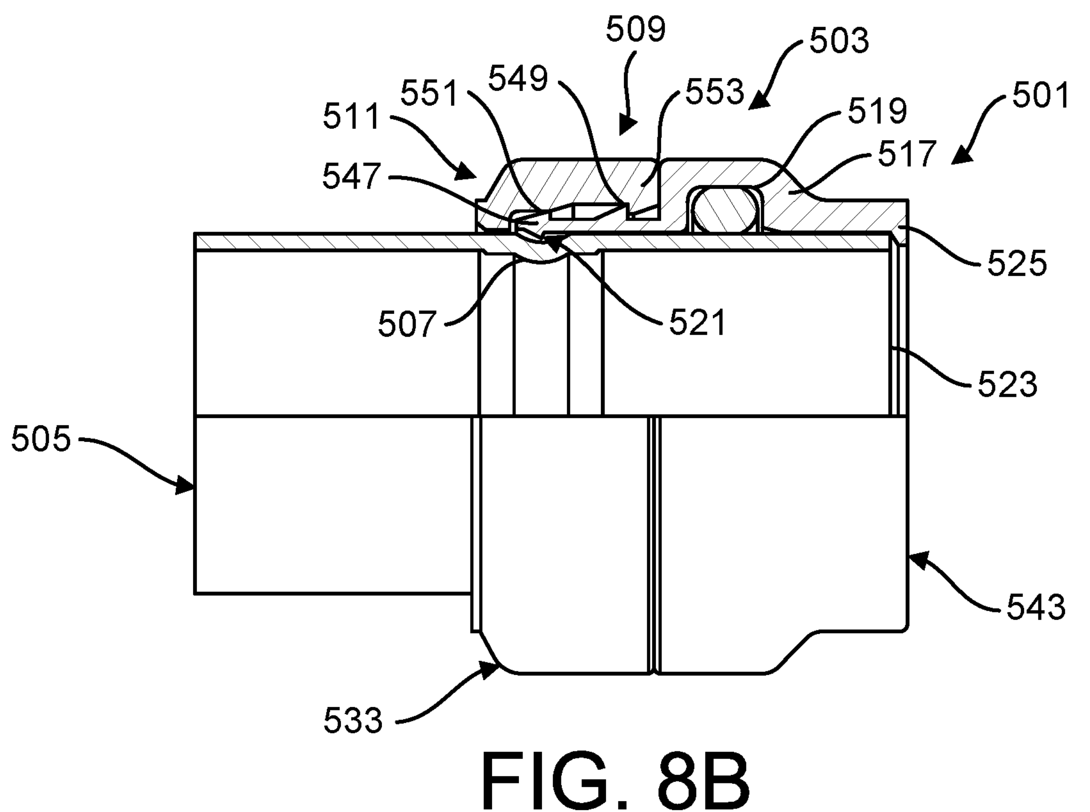
Figure 9A:
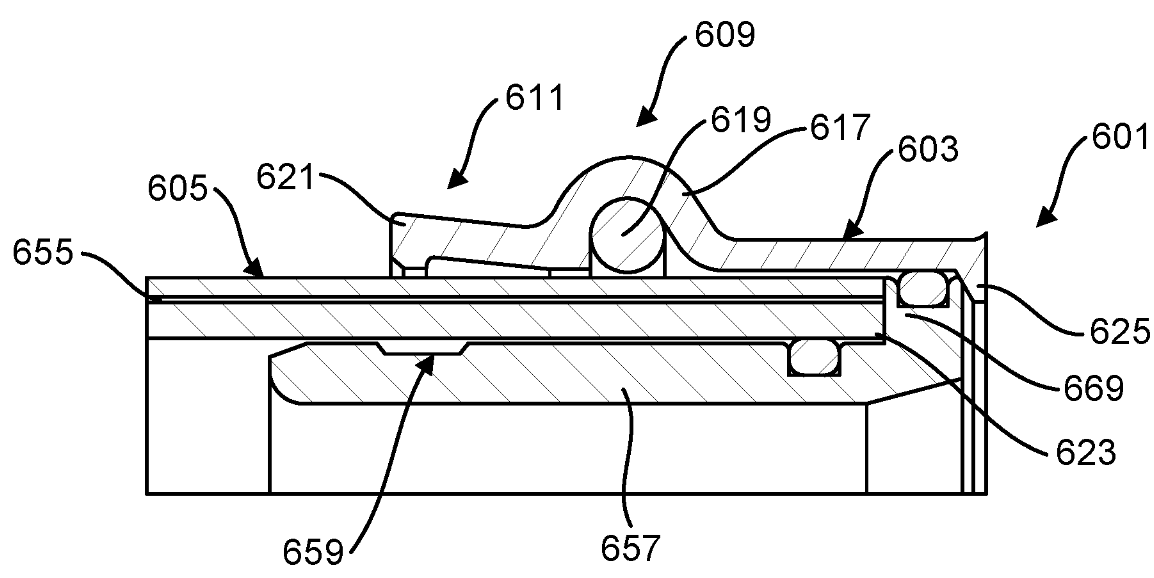
Figure 9B:
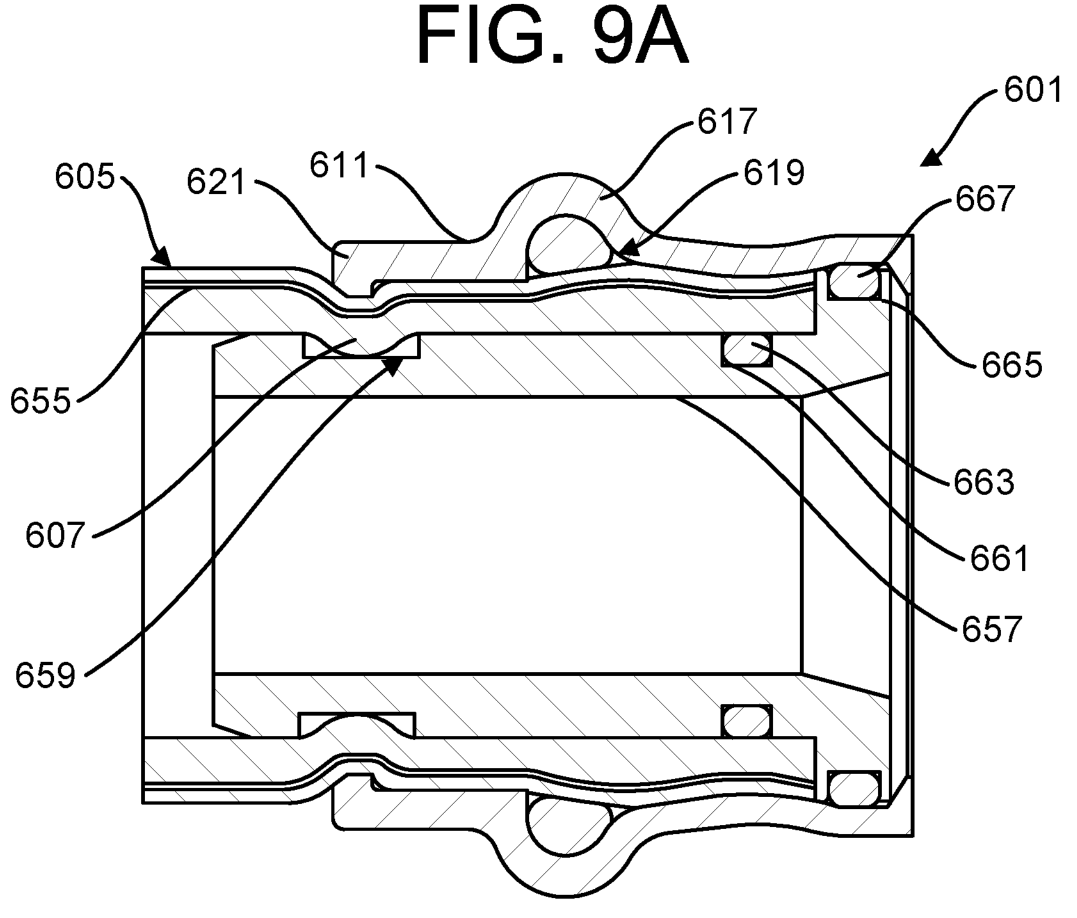
Figures 9C, 9D, 9E:
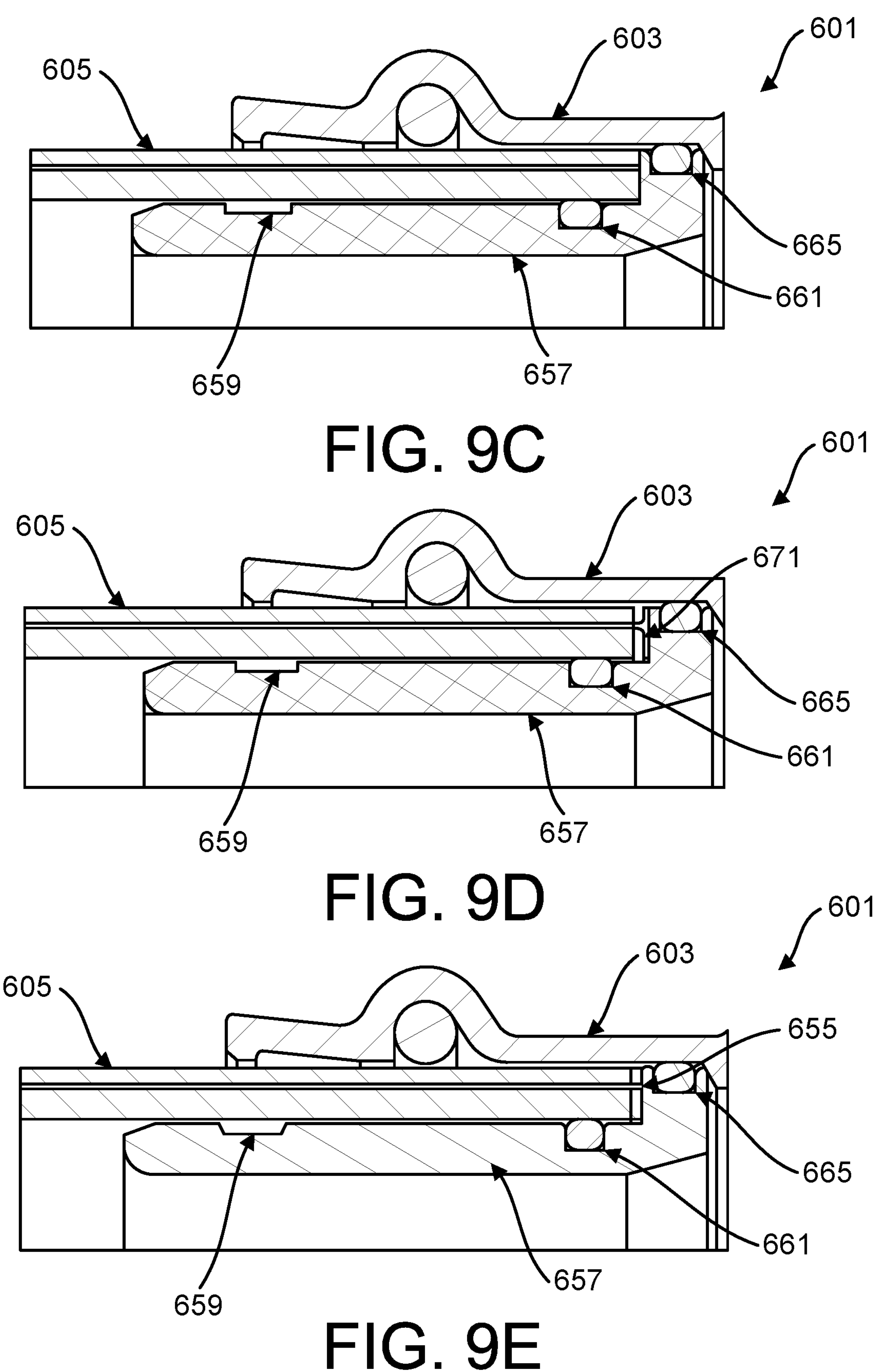

FIG. 8*a* is a cross sectional view of a seventh embodiment of the invention in a preconnected state;

FIG. 8*b* is a cross sectional view of the seventh embodiment of FIG. 8*a* in a connected state;

FIG. 9*a* is a cross sectional partial view of an eighth embodiment of the invention in a preconnected state;

FIG. 9*b* is a cross sectional view of the eighth embodiment of the invention in a connected state;

FIGS. 9*c* to 9*e* are variations of the eighth embodiment shown in FIG. 9*a;*

Figure 10:
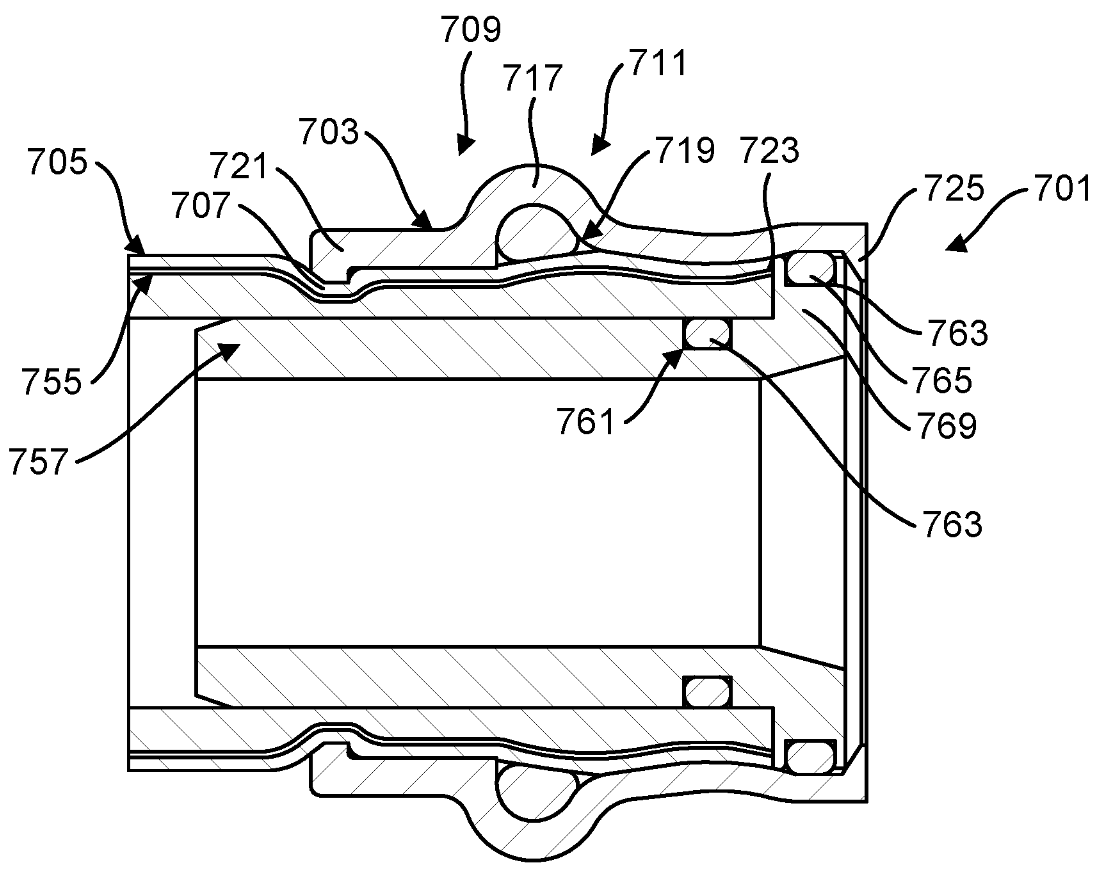
Figure 11:
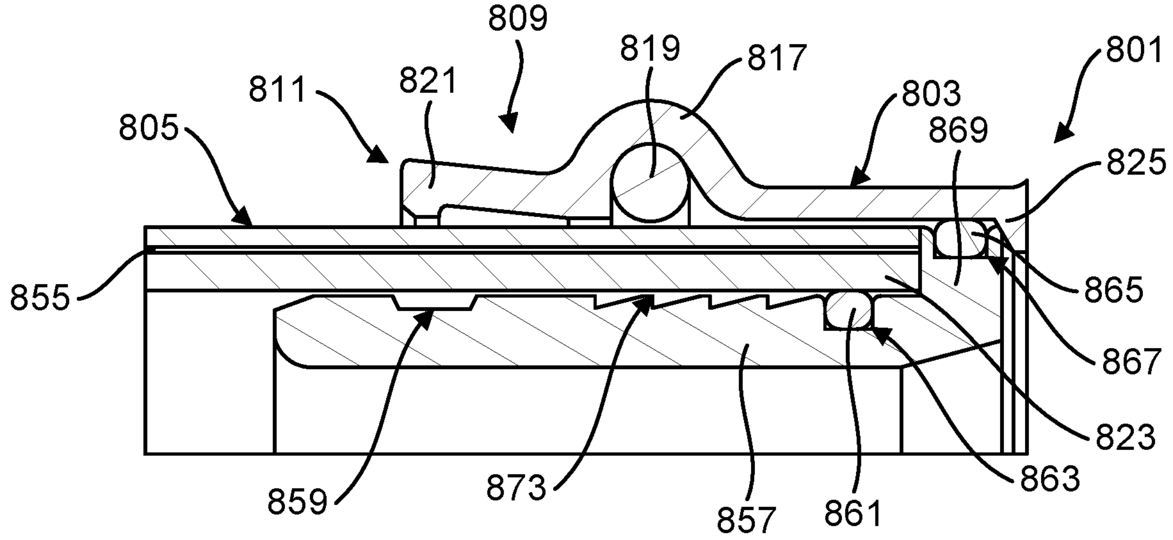
Figure 12A:
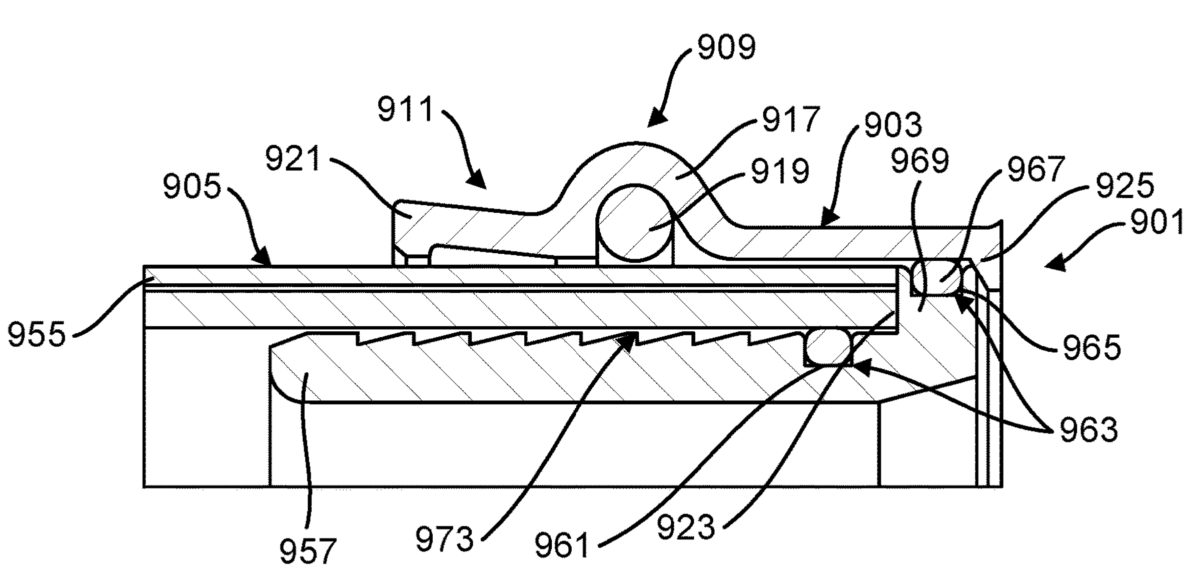
Figure 12B:
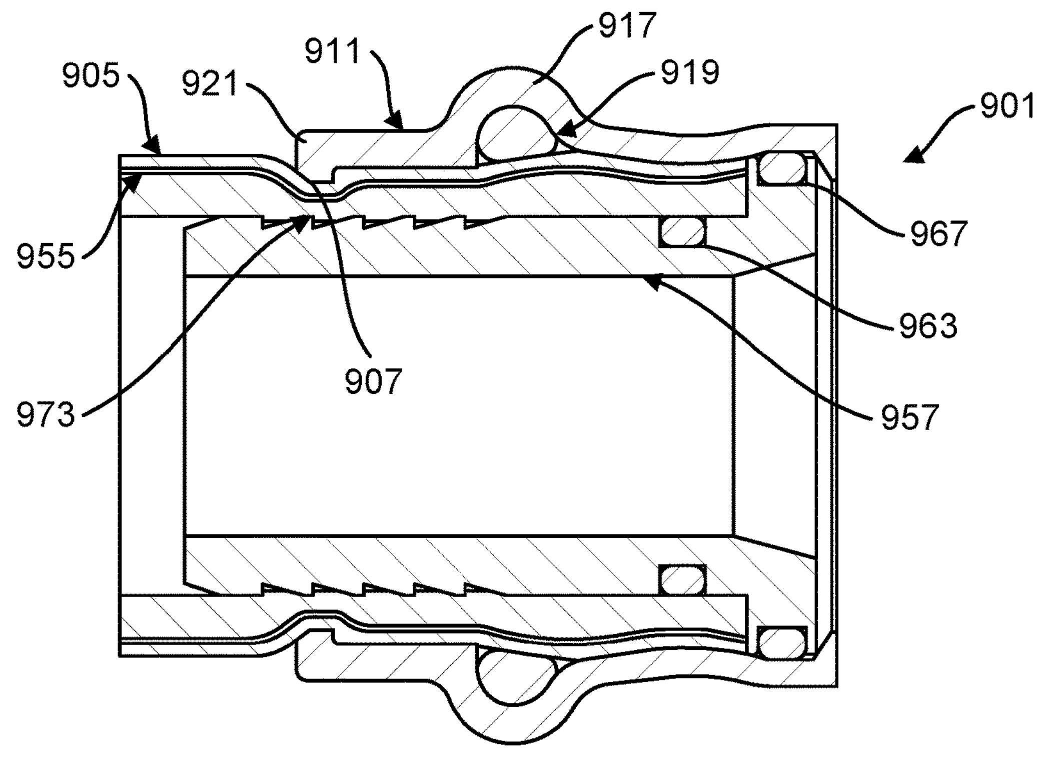

FIG. 10 is a cross sectional view of a connection element;

FIG. 11 is a cross sectional partial view of a ninth embodiment of the invention;

FIG. 12*a* is a cross sectional partial view of a further connection element in a preconnected state; and FIG. 12*b* is a cross sectional view of connection element in a connected state.

DETAILED DESCRIPTION

Figure 1:
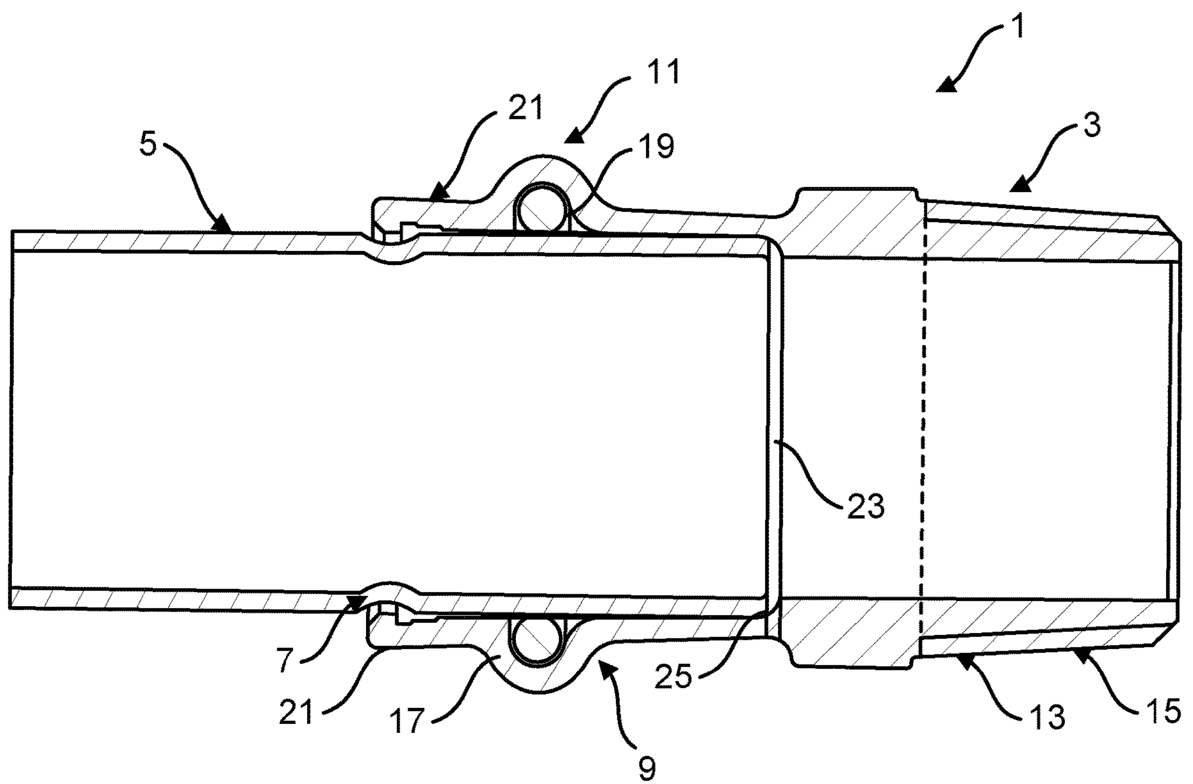
FIG. 1 is a cross sectional view of an inventive tubing connection according to a first embodiment.

FIG. 1 shows a cross sectional view of a tubing connection according to a first aspect of the invention. The tubing connection 1 comprises a fitting 3 and a tubular element 5. As can be taken from FIG. 1 the tubular element 5 comprises a crimp 7 forming a second crimp in the sense of the claims formed on the outer surface of the tubular element.

The thickness of the wall of the tubular element 5 is constant over the whole length of the tubular element 5, especially in the area of the crimp 7. The fitting 3 comprises a first section 5 including a first connection element 11. Furthermore the fitting 3 comprises a second end section 13 comprising a second connection element in form of a thread 15.

In the area of the end section 9 furthermore an annular groove 17 is provided in which a first sealing element in form of an O-ring 19 is located. According to the invention the first connection element 11 comprises a hook element 21 forming a first hook element in the sense of the claims. The hook element 21 is formed as an annular element that is projecting radially inwardly from the fitting 3.

To connect the fitting 3 to the tubular element 5 to provide the tubing connection 1 the tubular element 5 is introduced into the fitting 3 such that an end 23 of the tubular element 5 engages an alignment element in form of a step 25. With the step 25 it is secured that the crimp 7 is aligned with the hook 22. With a pressing tool known in the state of the art the end section 9 is then compressed such that the diameter of the fitting, especially of the area of the hook 22, is at least partly reduced, such that the hook 22 engages in a form-fit and force-fit manner into the crimp 7.

As already described above in FIG. 1 an embodiment of the invention is shown in which the end section 9 having the inventive hook 22 is combined with a threaded section 13.

Figure 2:
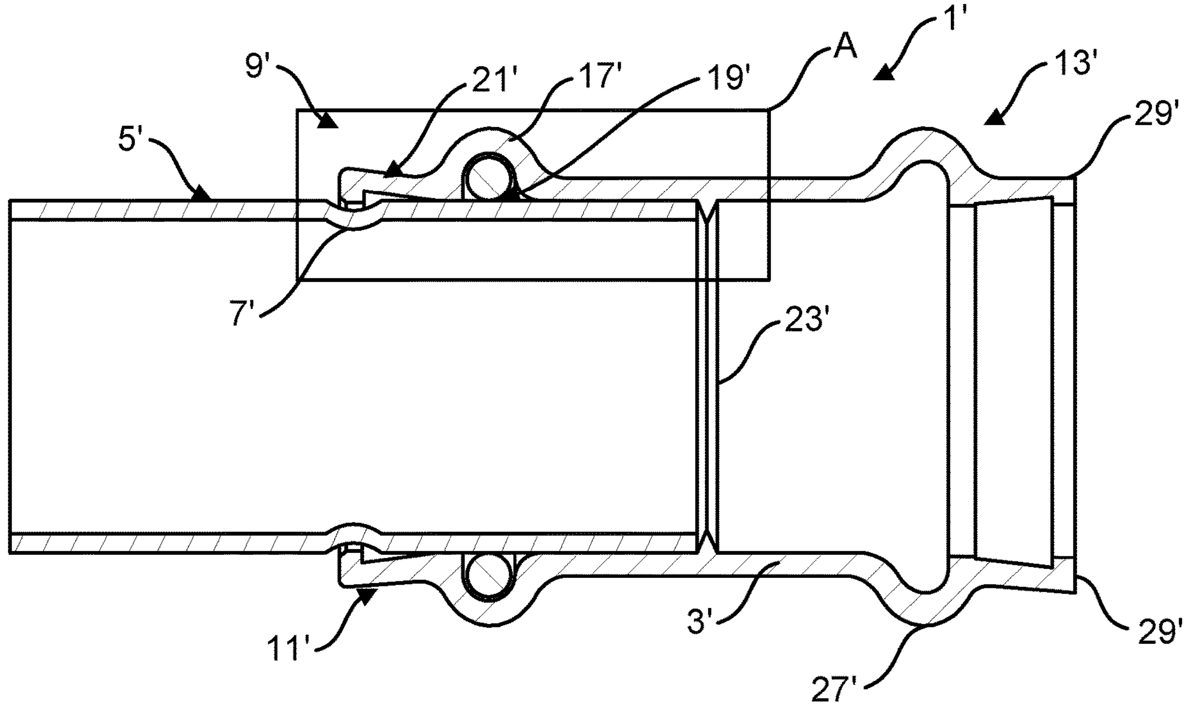
FIG. 2 is a schematic cross sectional view of an inventive tubing connection according to a second embodiment.

As can be taken from FIG. 2 the invention might however be also utilized such that the fitting comprises two end sections comparable to the end section 9. In FIG. 2 the tubing connection 1' does comprises an end section 9' and an end section 13'.

The elements of the tubing connection 1´ that are functionally corresponding to the elements of the tubing connection 1 have the same reference number, however ticked. In comparison to the step 25 in the tubing connection 1´ a circumferential projection 25´ is provided. Furthermore the end section 13´ comprises an annular groove 27´ comparable to the groove 17´ and a hook element 29´ representing a third hook element in the sense of the claims comparable to the hook element 21´.

Thus to connect the tubular elements the tubular elements are inserted into the fitting 3' and the end section 9' as well as the end section 13' are pressed such that at least a part of the diameter of the respective end sections, especially in the area of the hooks 22', 29', is reduced. Variations of such fittings and tubing connections provide multiple sockets with different angular directions and/or tube diameters. The tubular element 5 as well as the fitting 3 may be metallic or made of plastic.

Figure 3:
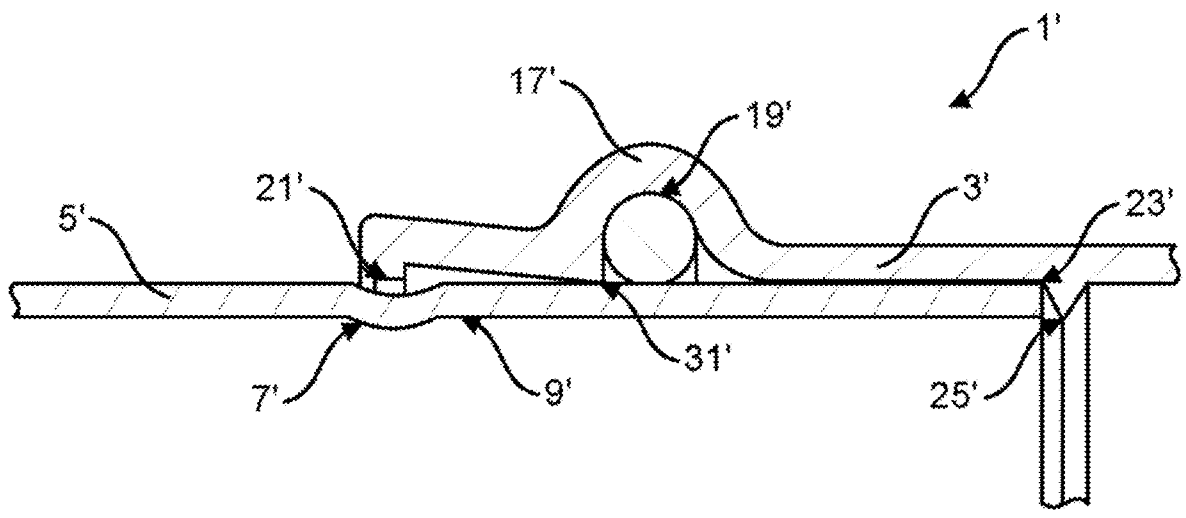
FIG. 3 is a cross sectional detail view of the section A in FIG. 2.

In FIG. 3 a detail view of the section A in FIG. 2 is shown. From FIG. 3 it becomes especially apparent that the (first) hook 21´ is positioned to coincident with a preformed circumferential indentation forming the (second) crimp 7´. To provide a coincident of the hook 21´ and the crimp 7´ an inclusion of an internal circumferential projection 25´ to engage with a tube end 23´ is used. In this way the distance between the hook element 21´ and the projection 25´ is approximate to the distance between the crimp 7´ and the tube end 23´. As it is furthermore shown in FIG. 3 in the area of the groove 17´ a gripping element in form of a sharp edge 31´ is utilized to provide additional tube engagement, especially in case a relative to the fitting 3 occurs.

Figure 4:
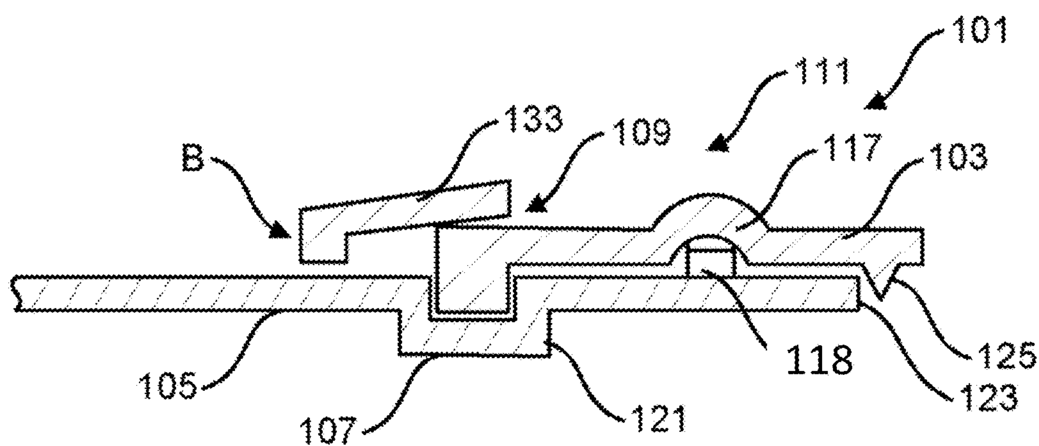
FIG. 4 is a cross sectional partial view of a third embodiment of the invention.

In FIG. 4 a partial cross sectional view of a third embodiment of an inventive tube connection 101 is shown. The elements of the tube connection 101 that correspond to the elements of the tube connection 1 and 1', respectively, have the same reference numbers, however increased by 100.

In comparison to the before described embodiments in the embodiment shown in FIG. 4 at least partly pressing of the first connection 111 is reached by a cap element 133. As can be seen from FIG. 4 the cap has an inclined inner surface such that when the cap 133 is pushed into the direction B in FIG. 4 the first connection element 111 is compressed, especially the hook element 121 is forced into the crimp 107. The movement of the cap 133 might be reached by a not shown thread. Furthermore, instead of an O-Ring the sealing element comprises a receptacle 118 comprising at least one sealant, wherein the receptacle is ruptured when the diameter of the section 109 is reduced, whereby releasing the sealant contained in the receptacle.

Figure 5:
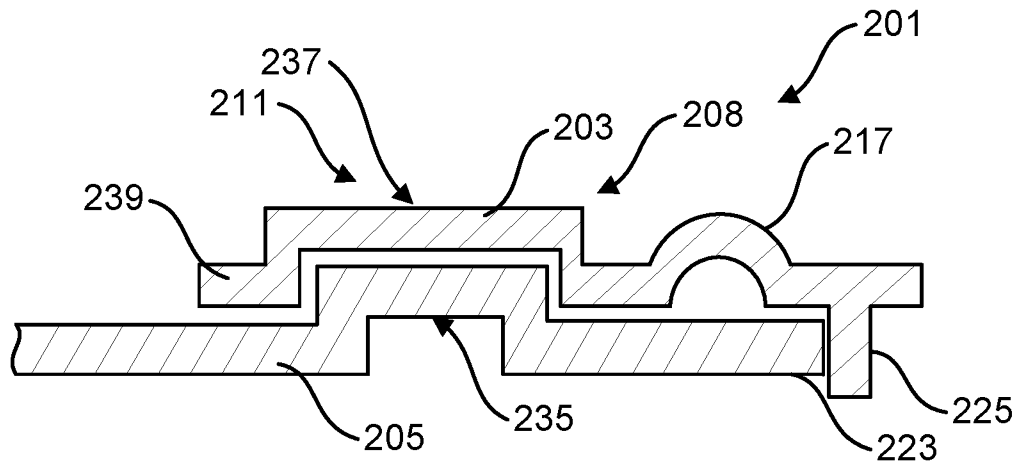
FIG. 5 is a cross sectional partial view of a fourth embodiment of the invention.

In FIG. 5 the partial cross sectional view of a fourth embodiment of an inventive tube connection 201 is shown. The elements of the tube connection 201 that correspond to the elements of the tube connection 1 have the same reference numbers, however increased by 200.

In contrast to the before described embodiments the respective hook element of the first connection element is not formed in the fitting 203 but is provided in the tubular element in form of a hook element 235 representing a second hook element in the sense of the claims. The hook element 235 is cooperating with a crimp 237 that is formed in the fitting 203 and represents a first crimp in the sense of the claims.

In FIG. 5 the tube connection 201 is shown in the connected status. This means that the fitting 203 has at least partly been compressed, especially in the area of the first connection element 211 such that the crimp 237 engages in a force-fit and form-fit manner the hook 235 formed in the tubular element 205. Before the compression the crimp 237 had a greater diameter to receive the tubular element 205, especially the hook 235. Especially an end element 239 provided a diameter of the fitting 203 that was greater than the diameter of the tubular element 205 in the area of the hook 235.

Figure 6:
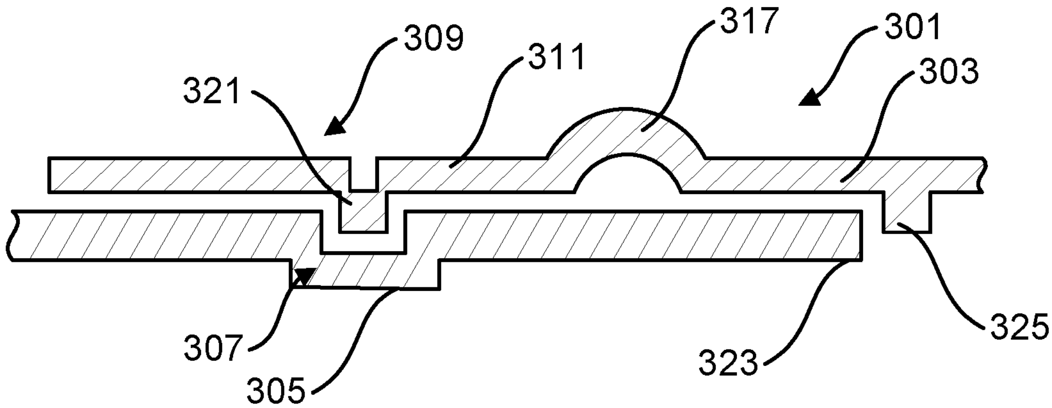
FIG. 6 is a cross sectional partial view of a fifth embodiment of the invention.

FIG. 6 shows a partial cross sectional view of a fifth embodiment of an inventive tube connection 301. The elements of the tube connection 301 that correspond to the elements of the tube connection 1 have the same reference number, however increased by 300.

The tube connection 301 mainly differs from the tube connection 1 in that neither the (second) crimp 307 nor the (first) hook element 321 have been preformed in the tubular element 305 and a fitting 303, respectively. Both the crimp 307 and the hook element 321 have been formed when the diameter of the first connection element 311 has been at least partly reduced.

Thus in the unconnected state the fitting 303 and the tubular element 305 have a mainly flat or cylindrical cross sectional form. However by the pressing the hook element 321 is formed and due to the pressure that is transferred via the hook element 321 onto the surface of the tubular element 305 the crimp 307 is formed. However still a form-fit between the crimp 307 and the hook element 321 is reached such that due to the annular form of the hook element 321 and the crimp 307 a relative movement between the tubular element 305 and the fitting 303 also it high pressures is avoided.

Figure 7:
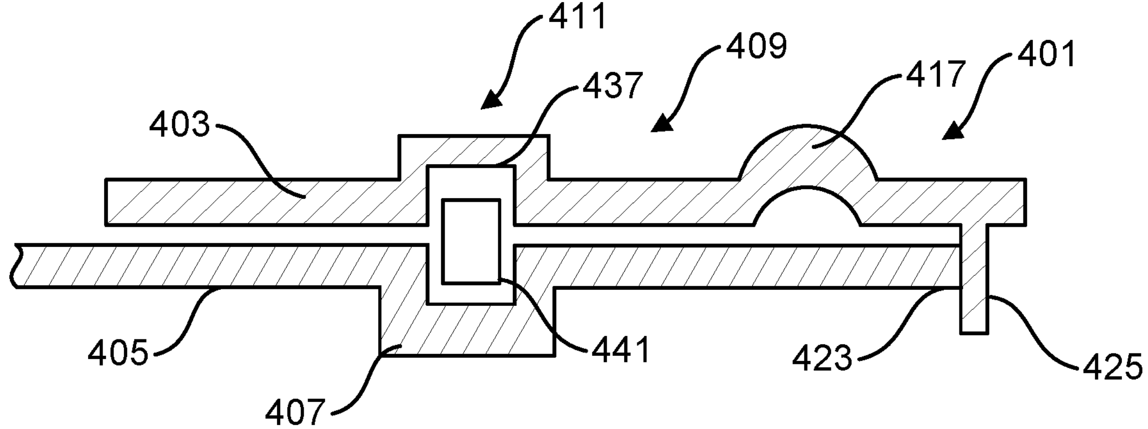
FIG. 7 is a cross sectional partial view of a sixth embodiment of the invention.

In FIG. 7 a sixth embodiment of the invention in form of a tube connection 401 is shown. The elements of the tube connection 401 that correspond to the elements of the tube connection 1 have the same reference number, however increased by 400.

In contrast to the tube connections 1, 1', 101, 201, 301 described before the form-fit and force-fit connection between the fitting 403 and the tubular element 405 is not reached by a hook/crimp connection but a connection between two crimps. Similar to the tube connection 1 the tubular element 405 comprises a (second) crimp 407. Comparable to the tube connection 201 the fitting 403 comprises a (first) crimp 437. To reach a form-fit and force-fit connection between the crimps 407, 437 in the crimps a securing element in form of a latch ring 441 is positioned. To connect the tubular element 405 to the fitting 403 the latch ring 441 is located within the crimp 407, when the fitting 403 is pushed over the tubular element 405. However at this point of time before a pressing of the fitting 403 the diameter of the tubular element 405 is increased, especially in the area of the crimp 437 such that the latch ring 441 can be located in the area of the crimp 437. When the diameter of the first connection element 411 is at least partly reduced the crimp 437 engages the latch ring 441 leading to a form-fit and force-fit connection of the tubular element 405 and the fitting 403.

FIG. 8*a* shows a cross sectional view of a tubing connection 501 according to a seventh embodiment of the invention. The elements of the tubing connection 501 which corresponds to the elements of the tubing connection 1 have the same reference number, however increased by 500. Similar to the tubing connection 101 the tubing connection 501 comprises a cap 533. The cap 533 forms a part of the fitting 503 which comprises a fitting body 543 and the cap 533 in form of a sleeve.

Furthermore the tubing connection 501 differs from the before described tubing connections, especially fittings, in that the hook element 521 is formed by a plurality of teeth 547 that are formed on a plurality of tongues 545. In addition to the teeth 547 covering only a part of the circumference of the tubular element 505 respectively, the tongues 545 furthermore comprises respective sleeve retainers 549.

In FIG. 8*a* the tubing connection 501 is shown in a preconnected state, that means the hook element 521 is in a form-fitted manner but not in a force-fitted manner connected to the crimp 507. By pushing the sleeve 533 into the direction of the fitting body 543 the engagement surface 551 on the inside of the sleeve 533 gets into contact with the surface of the hook element 521 such that a radially outward movement of the hook element 521 is prohibited as shown in FIG. 8*b*. Furthermore in this position an engagement element 553 is in connection with the sleeve retainer 549 such that the sleeve 533 is hold in the position shown in FIG. 8*b*.

In not shown embodiments the sleeve and the fitting might be connectable via a threaded connection and/or a bayonet connection. Thus by a rotational movement of the sleeve a longitudinal movement of the sleeve along the fitting is caused.

In FIG. 9*a* a partial cross sectional view of an eighth embodiment of the invention in form of a tubing connection 601 is shown. The elements of the tubing connection 601 with corresponds to the elements of the tubing connection 1 have the same reference number, however increased by 600.

The tubing connection 601 comprises a metallic fitting 603 and a tubular element 605 which is made at least partially of a plastic material.

To allow an electrical connection via the tubular element 605 the tubular element comprises a conductive pipe layer 655. Furthermore the tube connection 601 comprises a pipe insert 657. The pipe insert 657 is inserted partly into the tubular element 605 and comprises a indentation. This indentation might have the form of a fifth crimp 659 having a continuous thickness but might also be formed by a cut out, a pressed indentation or any other forming style.

Furthermore the pipe insert 657 comprises a first clearance 661 into which a second sealing element in form of an O-Ring 663 is inserted. By the O-Ring 663 a gap between the tubular element 605 and the pipe insert 657 is sealed. Furthermore the pipe insert 657 comprises a second clearance 665 into which a third sealing element in form of an O-Ring 667 is inserted. By the O-Ring 667 a gap between the pipe insert 657 and the fitting 603 is sealed.

In FIG. 9*b* the tube connection 601 is shown in a connected state. As can be taken from the FIG. 9*b* by pressing a part of the connection 611 in a radial direction the tubular element 605 has been deformed in the area of the hook element 621 and the crimp 659, respectively. By this deformation a first crimp 607 is formed within the tubular element 605. As can be taken furthermore from FIGS. 9*a* and 9*b* the step 625 fulfils the function of an alignment element to align the pipe insert 657 relative to the fitting 603. Furthermore by a step 669 formed within the pipe insert 657 the tubular element 605 is aligned relative to the pipe insert 657 and thus relative to the fitting 603.

The use of the pipe insert 657 further allows a user to better check the correct position of the fitting 603 relative to the tubular element 605 by a marking process. For this purpose the user can use the step 669 to align the pipe insert 657 with the tubular element 605 before the pressing of the fitting 603. In a first step the user positions the end of the tubular element 605 side by side to the pipe insert 657 such that the step 669 abuts the end 623 of the tubular element 605. The user then marks on the outside of the tubular element 605 where the fifth crimp 659 is located. In other words the user uses the crimp 659 as a guidance for a depth marking. In the next step the user then inserts the pipe insert 657 into the tubular element 605 as shown in FIG. 9*a* and presses the fitting 603.

In case the tubing connection 601 is connected in the correct way the position of the marking will fall under the hook element 621. Thus in case the position of the marking and the hook element 621 will not fall together it is indicated to the user that the fitting 603 is not connected correctly.

In FIGS. 9*c* to 9*e* variations of the tube connection 601 are shown. As can be taken from a comparison of FIGS. 9*a* and 9*c* the crimp 659 within the pipe insert 657 might have different cross sectional forms.

Furthermore the tube connection might comprise, as shown in FIG. 9*d*, a pipe conductor 671 leading to an electrical connection of the pipe insert 657 with the pipe layer 655.

Such a connection might also be provided by a pipe layer 655 that extends out of the tubular element 605 as shown in FIG. 9*e*.

In FIG. 10 a tubing connection 701 is shown which does not represent an embodiment of the invention but which is helpful in understanding the same. The elements of the tubing connection 701 which correspond to the elements of the tubing connection 601 have the same reference number, however increased by 100, except for the element 707 being an indentation. In not shown alternatives of the tubing connection 701 the element 707 could be formed as a crimp in the sense of the invention, i.e. that a wall thickness of the tubular element in the area of the crimp 707 is mainly constant.

As can be taken from FIG. 10 the pipe insert 757 might have a flat or plain surface, especially might not have an additional crimp. Irrespective of this missing crimp by a pressing of the connection 711 the hook element 721 deforms the tubular element 705 such that an indentation on 707 is formed that is in form-fit and force-fit connection to the hook element 721.

In FIG. 11 a ninth embodiment of the invention in form of a tube connection 801 is shown. The elements of the tubing connection 801 that correspond to the elements of the tubing connection 601 have the same reference number, however increased by 200.

In comparison to the tube connection 601 the tube connection 801 comprises a pipe insert 857 that provides a gripping structure on the outer surface in form of teeth 873.

A variation of the tubing connection 801 is shown in FIG. 12*a* in form of a tubing connection 901 which does not represent an embodiment of the invention but which is helpful in understanding the same. Elements of the tubing connection 901 corresponding to tubing connection 601 have the same reference number, however increased by 300 except for element 907. In the tube connection 901 the pipe insert does not provide a crimp corresponding to the crimp 859 but nearly the complete outer surface of the pipe insert 957 is formed with a gripping structure comprising teeth 973.

In FIG. 12*b* the tube connection 901 is shown in a connected state. By the pressing of the connection 911 the tubular element 905 has been deformed such that an indentation 907 is formed which is engaged by the hook element 921 in a form-fit and in force-fit manner. In not shown alternatives of the tubing connection 901 the element 907 could be formed as a crimp in the sense of the invention, i.e. that a wall thickness of the tubular element in the area of the crimp 907 is mainly constant.

The features disclosed in the claims, the specification and the drawings might be relevant for the claimed subject-matter in its different embodiments separately or in any combination.

REFERENCE SIGN LIST

1, 1´, 101, 201, 301, 401, 501, 601, 701, 801, 901 tubing connection

3, 3´, 103, 203, 303, 403, 503, 603, 703, 803, 903 fitting

5, 5´, 105, 205, 305, 405, 505, 605, 705, 805, 905 tubular element

7, 7´, 107, 207, 307, 407, 507, 607 crimp

707, 907 indentation

9, 9´, 109, 209, 309, 409, 509, 609, 709, 809, 909 end section

11, 11´, 111,211,311,411, 511, 611, 711, 811, 911 connection

13, 13´ end section

15 thread

17, 17´, 117, 217, 317, 417, 517, 617, 717, 817, 917 groove

118 receptable

19, 19´, 519, 619, 719, 819, 919 O-ring

21, 21´, 121, 321, 521, 621, 721, 821, 921 hook element

23, 23´, 123, 223, 323, 423,523, 623, 723, 823, 923 end

25, 125, 225, 325, 425, 525, 625, 725, 825, 925 step

25´ projection

27´ groove
29´ hook element
31´ edge
133, 533 cap
235 hook element
237, 437 crimp
239 end element
441 latch ring
543 fitting body
545 tongue
547 teeth
549 sleeve retainer
551 engagement surface
553 engagement element
655, 755, 855, 955 pipe layer
657, 757, 857, 957 pipe insert
659, 859 crimp
661, 761, 861, 961 clearance
663, 763, 863, 963 O-Ring
665, 765, 865, 965 clearance
667, 767, 867, 967 O-Ring
669, 769, 869, 969 step
671 pipe conductor
873, 973 teeth
A section
B direction

The invention claimed is:

1. A tubing connection, comprising:

at least one fitting having a first end comprising a first connection element, the diameter of at least a part of the first connection element configured to be reduced in a radial direction, the first connection element comprising (i) at least one radially inwardly extending first hook element being pre-formed in the fitting prior to a pressing of the fitting and being formed as an element that runs circumferentially around the fitting, and (ii) at least one radially outwardly extending portion forming at least one annular recess;

a tubular element connected to the fitting, the tubular element comprising at least one crimp or at least one second hook element formed on an outer surface of the tubular element; and at least one sealing element arranged at least partly in the at least one recess;

wherein:

the at least one radially inwardly extending first hook element is configured to be connected in a force-fit or a form-fit manner to the at least one crimp or the at least one second hook element formed in response to the diameter of at least a part of the first connection element being reduced;

the at least one radially outwardly extending portion additionally forms, at a terminus of the at least one annular recess at a turning point from the annular portion to a parallel to the tubular element running straight portion of the fitting, a gripping element for engaging the outer surface of the tubular element; and the gripping element is axially spaced apart from the at least one radially inwardly extending first hook element.

2. The tubing connection according to claim 1, wherein a wall thickness of the tubular element in the area of the at least one crimp is constant and identical to the wall thickness of the remaining part of the tubular element.

3. The tubing connection according to claim 2, wherein the at least one crimp comprises at least one first indentation on the outer surface of the tubular element and at least one elevation on the inner surface of the tubular element.

4. The tubing connection according to claim 1, wherein:

at least one of (i) the tubular element or (ii) the fitting comprises at least one metallic material and one or more of (a) carbon material or (b) at least one plastic material, the at least one metallic material comprises one or more of: copper, iron, steel, stainless steel, brass, cast material or forged material, and the at least one plastic material comprises one or more of polymethylmethacrylate, polycarbonate, polyvinyl chloride, glass fiber or reinforced plastic.

5. The tubing connection according to claim 1, wherein the at least one sealing element comprises at least one of: a sealing ring, an O-ring, an elastomeric material, a viscous fluid sealant, or adhesive sealant.

6. The tubing connection according to claim 5, further comprising at least one receptacle including at least one sealant, the receptacle being configured to rupture when the diameter of at least a part of the first connection element is reduced thereby releasing the at least one sealant contained therein.

7. The tubing connection according to claim 1, further comprising:

at least one receptacle encapsulating a sealant and configured to release the sealant upon a reduction of a diameter of the at least one first connection element.

8. The tubing connection according to claim 1, further comprising an alignment element configured to align the tubular element with respect to the at least one fitting, wherein the alignment element comprises an inwardly extending projection or a step.

9. The tubing connection according to claim 1, further comprising a cap having an inclined inner surface, wherein the cap is configured to slide over the first connection element to reduce the diameter of the at least a part of the first connection element in the radial direction.

10. The tubing connection according to claim 1, further comprising a liner body at least partly inserted into the tubular element, wherein the liner body comprises a fifth crimp or a cut out aligned along a longitudinal axis with the at least one radially inwardly extending first hook element.

11. A system comprising:

at least one fitting having a first end comprising at least one first connection element, the diameter of at least a part of the first connection element configured to be reduced in a radial direction, the first connection element comprising a radially inwardly extending first hook element being pre-formed in the fitting prior to a pressing of the fitting and being formed as an element that runs circumferentially around the fitting, the at least one first connection element having a first curved surface, the fitting having further at least one radially outwardly extending portion forming at least one annular recess; and at least one tubular element connected to the fitting, the tubular element comprising securing means formed on an outer surface of the tubular element for securing the at least one tubular element to the at least one fitting in response to the diameter of at least a part of the first connection element being reduced, the securing means having a second curved surface which is complementary to the first curved surface;

wherein:

the at least one radially outwardly extending portion additionally forms, at a terminus of the at least one annular recess at a turning point from the annular portion to a parallel to the tubular element running straight portion of the fitting, a gripping element for engaging the outer surface of the at least one tubular element; and the gripping element is axially spaced apart from the first hook element.

12. The system according to claim 11, wherein the radially inwardly extending first hook element comprises a plurality of tongues and a plurality of teeth formed on the plurality of tongues.

13. The system according to claim 11, further comprising a liner body at least partly inserted into the at least one tubular element, the liner body comprising a second sealing element arranged to seal a space between the liner body and the at least one tubular element, and a third sealing element arranged to seal a space between the liner body and the at least one fitting.

14. The system according to claim 11, wherein the at least one fitting further comprises a second connection element, and wherein the at least one fitting comprises a plurality of sockets extending in different angular directions.

15. An apparatus comprising:

at least one fitting having an end comprising at least one connection element, a diameter of at least a part of the at least one connection element configured to be reduced in a radial direction, the at least one connection element comprising (i) at least one radially inwardly extending hook element being pre-formed in the fitting prior to a pressing of the fitting and being formed as an element that runs circumferentially around the fitting, and (ii) at least one radially outwardly extending portion forming at least one annular recess;

at least one tubular element connected to the fitting and comprising at least one crimp formed on an outer surface of the tubular element; and at least one sealing element arranged at least partly in the at least one annular recess and configured to seal the at least one fitting relative to the at least one tubular element, wherein:

the at least one radially inwardly extending hook element is configured to be connected in a force-fit or a form-fit manner to the at least one crimp formed in response to the diameter of at least a part of the at least one connection element being reduced;

the diameter of an area between the hook element and the annular recess is reduced to connect the hook element to the crimp; and the at least one radially outwardly extending portion additionally forms, at a terminus of the at least one annular recess, a gripping element comprising a sharp edge for engaging the outer surface of the tubular element.

16. The apparatus of claim 15, wherein:

the at least one radially outwardly extending portion comprises a first radially outwardly extending portion forming a first annular recess and a second radially outwardly portion forming a second annular recess;

the at least one sealing element comprises a first sealing element arranged in the first annular recess and a second sealing element arranged in the second annular recess.

17. A method comprising:

providing a fitting having a first end comprising a connection element, the diameter of at least a part of the connection element configured to be reduced in a radial direction, the connection element comprising a radially inwardly extending hook element being pre-formed in the fitting prior to a pressing of the fitting and being formed as an element that runs circumferentially around the fitting and at least one radially outwardly extending circular portion, the fitting having at least one radially outwardly extending portion forming at least one annular recess;

providing a tubular element having a crimp formed on an outer surface of the tubular element; and inserting the tubular element into the at least one fitting prior to a reduction in a diameter of at least one section of the connection element in a radial direction, wherein by the reduction of the diameter, the hook element and the at least one radially outwardly extending circular portion are deformed to engage at least one crimp formed on the surface of the tubular element so as to provide a force-fit or form-fit connection of the fitting to the at least one tubular element;

wherein:

the at least one radially outwardly extending portion additionally forms, at a terminus of the at least one annular recess at a turning point from the annular portion to a parallel to the tubular element running straight portion of the fitting, a gripping element for engaging the outer surface of the tubular element; and the gripping element is axially spaced apart from the first hook element.

18. The method according to claim 17, further comprising aligning an end of the tubular element against an inwardly extending step of the fitting to align the crimp with the hook element prior to reducing the diameter of the at least one section of the connection element.

19. The method according to claim 17, wherein reducing the diameter of the at least one section of the connection element comprises sliding a cap or ring onto the connection element, wherein the cap or ring is connected to the connection element by a threaded connection or a bayonet connection.

20. The method according to claim 17, further comprising inserting a liner body into the tubular element before, during, or after inserting the tubular element into the at least one fitting.

* * * * *